(12) United States Patent
Streuer et al.

(10) Patent No.: US 8,846,228 B2
(45) Date of Patent: Sep. 30, 2014

(54) COVER FOR AN ELECTROCHEMICAL ACCUMULATOR AND ACCUMULATOR HAVING SUCH A COVER

(71) Applicant: VB Autobatterie GmbH & Co. KGaA, Hannover (DE)

(72) Inventors: Peter Streuer, Hannover (DE); Anne-Laure Ledoux, Langenhagen (DE); Karsten Strassburg, Hannover (DE); Julius Martin Schwab, Hannover (DE)

(73) Assignee: Johnson Controls Autobatterie GmbH & Co. KGAA (DE)

( * ) Notice: Subject to any disclaimer, the term of this patent is extended or adjusted under 35 U.S.C. 154(b) by 0 days.

(21) Appl. No.: 13/737,632

(22) Filed: Jan. 9, 2013

(65) Prior Publication Data
US 2013/0196200 A1 Aug. 1, 2013

(30) Foreign Application Priority Data

Jan. 12, 2012 (DE) .......................... 10 2012 100 227

(51) Int. Cl.
*H01M 2/12* (2006.01)
*H01M 2/36* (2006.01)
*H01M 2/04* (2006.01)

(52) U.S. Cl.
CPC ................ *H01M 2/36* (2013.01); *H01M 2/362* (2013.01); *Y02E 60/12* (2013.01); *H01M 2/12* (2013.01); *H01M 2/361* (2013.01); *H01M 2/04* (2013.01)
USPC .................................. 429/87; 429/89; 429/73

(58) Field of Classification Search
CPC ................................ H01M 2/36; H01M 2/367
USPC .................................................. 429/87, 89, 73
See application file for complete search history.

(56) References Cited

U.S. PATENT DOCUMENTS 6,045,940 A    4/2000   Feres

FOREIGN PATENT DOCUMENTS

| DE | 15 96 097 A1 | 4/1971 |
| DE | 3035616 A1 | 9/1980 |
| DE | 10143632 A1 | 9/2001 |
| EP | 0 462 403 A1 | 5/1991 |
| EP | 0 570 703 A1 | 4/1993 |
| GB | 791139 | 7/1955 |
| WO | WO 2010/023316 A1 | 3/2010 |

*Primary Examiner* — Jane Rhee
(74) *Attorney, Agent, or Firm* — Boardman & Clark LLP

(57) ABSTRACT

The invention relates to a cover part (1) of an electrochemical accumulator (40), which cover part is designed to form an upper covering of the housing (1, 30) of the accumulator (40), the cover part (1) having a plurality of filling orifices (2, 3), to be closed by means of closing plugs, for filling the housing with liquid electrolyte, characterized in that the filling orifices (2, 3) are arranged so as to be offset to one another in at least two rows (8, 9) lying next to one another. The invention relates, moreover, to an accumulator having a cover part of this type.

14 Claims, 5 Drawing Sheets

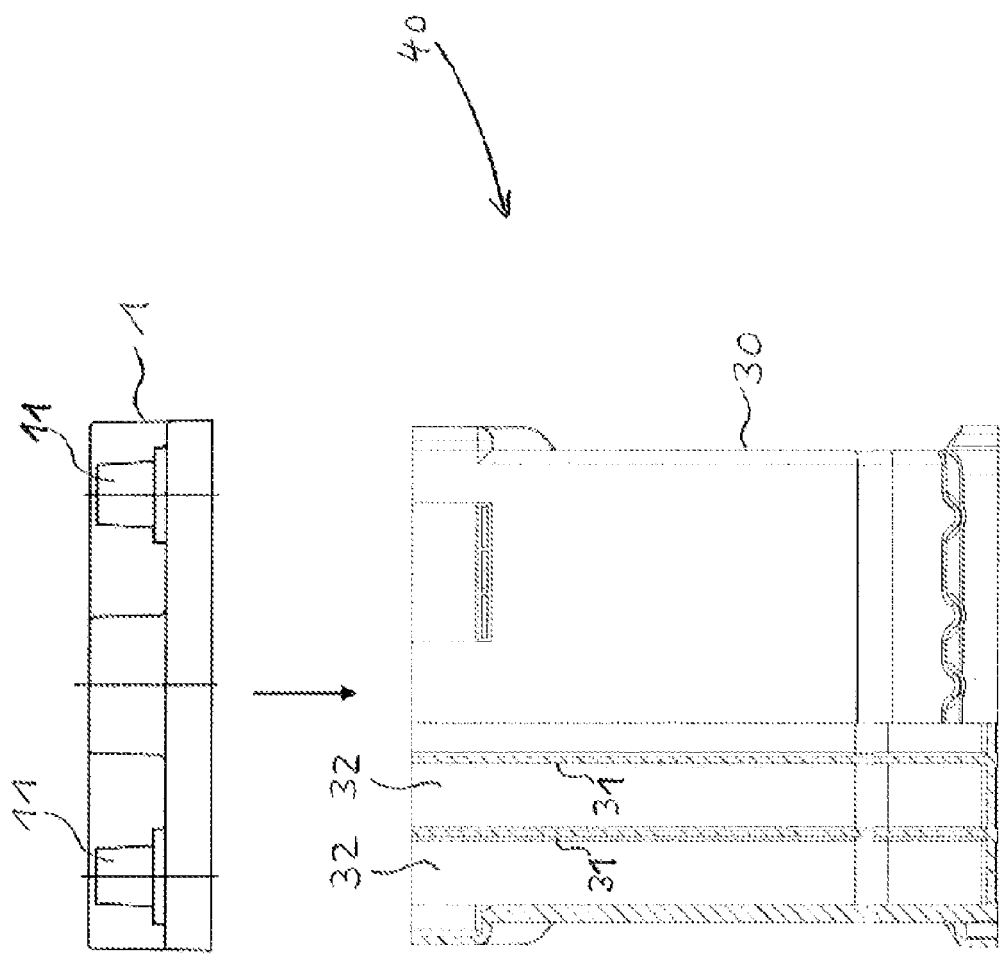

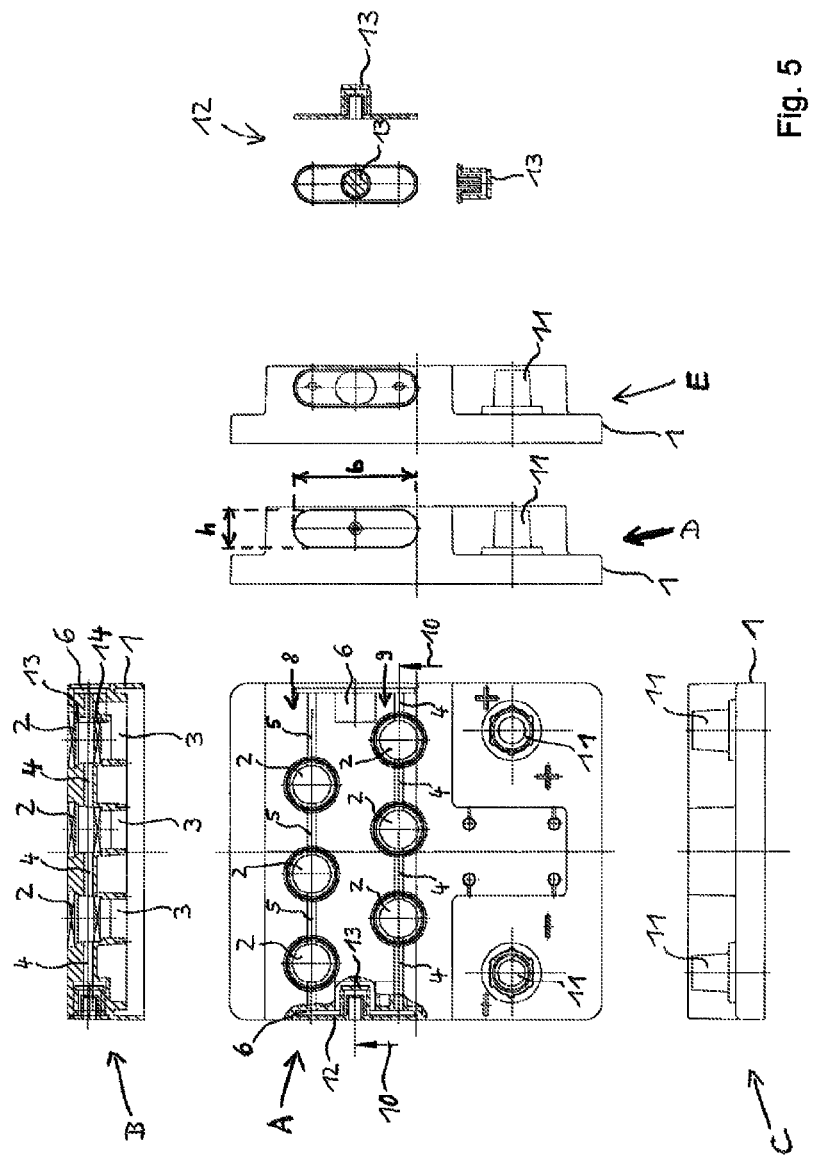

COVER FOR AN ELECTROCHEMICAL ACCUMULATOR AND ACCUMULATOR HAVING SUCH A COVER

Figure 1:
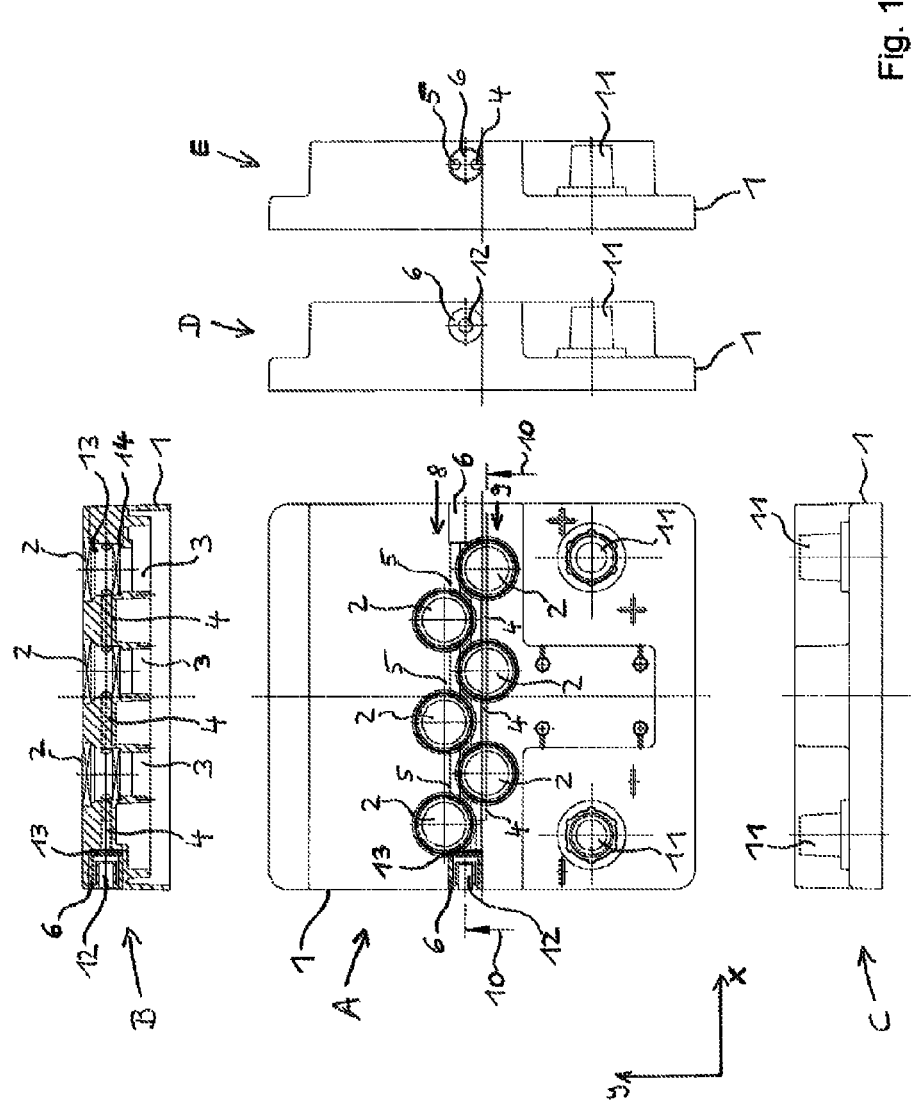

The invention relates to a cover part of an electrochemical accumulator according to claim 1. The invention relates, moreover, to an accumulator having a cover part of this type according to claim 14.

In general, the invention relates to electrochemical accumulators, such as, for example, lead/acid accumulators. Accumulators of this type have, in simplified terms, a housing formed from a housing lower part and from a cover part fastened to the latter. Where multi-cell accumulators are concerned, one or more cell walls, by which cell vessels separated from one another are formed, are arranged in the housing lower part. Electrode plate sets and the electrolyte, for example the acid, are arranged in the cell vessels. In such accumulators, it is necessary for access to the interior of the housing to be made possible even after production has been concluded. It is therefore known to provide filling orifices for liquid electrolyte in a cover part of such an electrochemical accumulator. The filling orifices are closed by means of closing plugs, designed for this purpose, when the filling operation is concluded and the accumulator is to be put to practical operational use.

An electrochemical accumulator is known, for example, from WO 2010/023316 A1.

The external dimensions and the position of specific components of such accumulators are standardized, at least in Europe, by various standards, for example by DIN EN 50342-2. However, there has in the meantime also been a need for electrochemical accumulators which have smaller dimensions than the minimum dimensions stipulated by the standards.

The object on which the invention is based, therefore, is to specify a cover part of an electrochemical accumulator, by means of which cover part it becomes possible to have an electrochemical accumulator in a construction size which is smaller than the smallest standard accumulators, but otherwise, as far as possible, affords the same advantages in terms of production and use. Furthermore, a corresponding accumulator is to be specified.

This object is achieved, according to claim 1, by means of a cover part of an electrochemical accumulator, which cover part is designed to form an upper covering of the housing of the accumulator, the cover part having a plurality of filling orifices, to be closed by means of closing plugs, for filling the housing with liquid electrolyte, the filling orifices being arranged so as to be offset to one another in at least two rows lying next to one another. The mutually offset arrangement of the filling orifices advantageously makes it possible to build an electrochemical accumulator in construction sizes below the minimum dimensions stipulated by DIN EN 50342-2, but which otherwise fulfils all the other features of the standard. In particular, the filling orifices may have the dimensions known from previous larger accumulators, so that all the other components, such as the closing plugs, ignition protection frit insert and formation bottles, can also continue to be used. Major changes therefore do not have to be carried out either in the area of production of such accumulators with smaller construction sizes or during later maintenance. On the contrary, existing components can continue to be used, thus making it possible to have cost-effective production and maintenance of such small-build accumulators.

The cover part may, in particular, be designed as what is known as a double cover, with an upper and a lower cover member, between which one or more degassing ducts run.

According to an advantageous development of the invention, the closing plugs of various rows of filling orifices are arranged so as to overlap, as seen transversely to the direction of extent of the rows, when the closing plugs are inserted into the filling orifices. Specific external dimensions of the filling orifices into which the closing plugs are inserted are then arranged correspondingly so as to overlap, as seen transversely to the direction of extent of the rows. This makes it possible to have an especially closely packed arrangement of filling orifices and closing plugs in the cover part. A higher packing density of the filling orifices and closing plugs is thereby achieved, as compared with known accumulators. In particular, the filling orifices of a respective row are spaced from one another in such a way that closing plugs of various rows of filling orifices can be arranged so as to overlap, as seen transversely to the direction of extent of the rows.

According to an advantageous development of the invention, the closing plugs of various rows of filling orifices are arranged so as to overlap, as seen in the direction of extent of the rows, when the closing plugs are inserted into the filling orifices. Specific external dimensions of the filling orifices into which the closing plugs are inserted are then arranged correspondingly so as to overlap, as seen in the direction of extent of the rows. This makes it possible to have a further increase in the packing density of the filling orifices and closing plugs in the cover part.

According to an advantageous development of the invention, the cover part is designed to be attached to a housing lower part which has a multiplicity of cell walls which extend longitudinally transversely to the direction of extent of the rows of filling orifices and by which cell vessels arranged in a single row and separated from one another are formed in the housing lower part. This makes it possible to have a closely packed arrangement of the filling orifices and closing plugs in the cover part, while at the same time the arrangement of the cell vessels in the housing lower part is adapted thereto. The cell vessels may be arranged in a known way in a single row next to one another in the housing lower part and be of essentially parallelepipedal shape, so that conventional electrode plate sets can be arranged therein without major modifications.

According to an advantageous development of the invention, the filling orifices are connected to one or more degassing ducts running in the cover part, the degassing duct or degassing ducts issuing into one or more gas outlet orifices of the cover part which are designed for discharging via the degassing duct or degassing ducts gases which are formed inside the accumulator. The advantage of this is that the degassing possibilities necessary in electrochemical accumulators can be accommodated in the cover part in a compact way and there is no need for any separate structural measures.

According to an advantageous development of the invention, a degassing duct has a round, oval or rectangular cross section.

According to an advantageous development of the invention, the degassing duct or degassing ducts runs or run essentially centrally through the filling orifices connected to the degassing duct or degassing ducts. The advantage of this is that the orifices which are formed at the interfaces between the degassing ducts and filling orifices are relatively large and therefore can be blocked less easily due to contaminating influences. The degassing duct does not in this case necessarily have to run exactly centrally through the filling orifices, although it is advantageous if the deviation from the middle of the filling orifice is less than 20% of the diameter of the filling orifice.

According to an advantageous development of the invention, filling orifices of various rows are connected to one another via a common degassing duct. This avoids the need to provide individual separate degassing ducts for the rows of filling orifices, this being advantageous in specific cover designs. The common degassing duct may be arranged, with respect to its mid-axis, symmetrically between the rows of filling orifices or else slightly asymmetrically. According to an advantageous development of the invention, the common degassing duct tangentially intersects the filling orifices connected to it. The common degassing duct can then end in a gas outlet orifice, for example a reception space for an ignition protection frit insert.

According to an advantageous development of the invention, different rows of filling orifices have in each case dedicated continuous degassing ducts which issue in separate degassing orifices. The degassing orifices may in this case directly form the gas outlet orifices or issue into a common reception chamber which then forms the gas outlet orifice. The common reception chamber may be designed, in particular, as a reception chamber for an ignition protection frit insert. The in each case dedicated continuous degassing ducts are advantageously formed separately, that is to say so as to be separated from one another.

The ignition protection frit insert may be designed, for example, as a plug-in plug with an ignition protection frit made from flame-retarding material.

According to an advantageous development of the invention, adjacent rows of filling orifices have in each case dedicated adjacent degassing ducts which run at a distance from one another which is no greater than the diameter of a reception chamber for an ignition protection frit insert. The advantage of this is that there is no need for separate ducts or a plurality of separate gas outlet orifices which would in each case have to be provided with dedicated ignition protection frit inserts. The degassing ducts may in this case, in an advantageous development, be designed to run rectilinearly.

According to an advantageous development of the invention, the reception chamber for an ignition protection frit insert is designed as an elongate chamber, the width of which is greater than the height and the width of which, moreover, is greater than the diameter of the ignition protection frit to be used. The width and height quantities relate to the reception chamber profile image visible on the cover part from outside, but not to the extent of the depth of the reception chamber into the interior of the cover part. This development has the advantage that, by means of a single ignition protection frit insert, the reception chamber can be closed even when the distances of the degassing ducts from one another are greater than the diameter of the ignition protection frit to be used.

According to an advantageous development of the invention, adjacent degassing ducts run parallel to one another. In particular, there may be provision for the degassing ducts to run parallel to one another in a straight direction.

The object mentioned in the introduction is achieved furthermore, according to claim 14, by means of an accumulator having a cover part of the type described above, which is fastened to a housing lower part of the accumulator. Fastening may take place, for example, by laser transmitted-light welding, welding with heat reflectors or other connection techniques for plastic parts. In an advantageous refinement, the cover part and/or the housing lower part are/is produced from plastic, for example from polypropylene.

According to an advantageous refinement of the invention, the accumulator is designed as an at least six-cell accumulator, in particular as a six-cell or twelve-cell accumulator.

The accumulator may also be designed as an AGM accumulator, AGM standing for Absorptive Glass Mat. In such accumulators, the liquid electrolyte is bound in a fiber-like material.

The invention is explained in more detail below by means of exemplary embodiments, using drawings in which:

FIG. 1—shows a cover part in a first embodiment in various views, and

Figure 2:
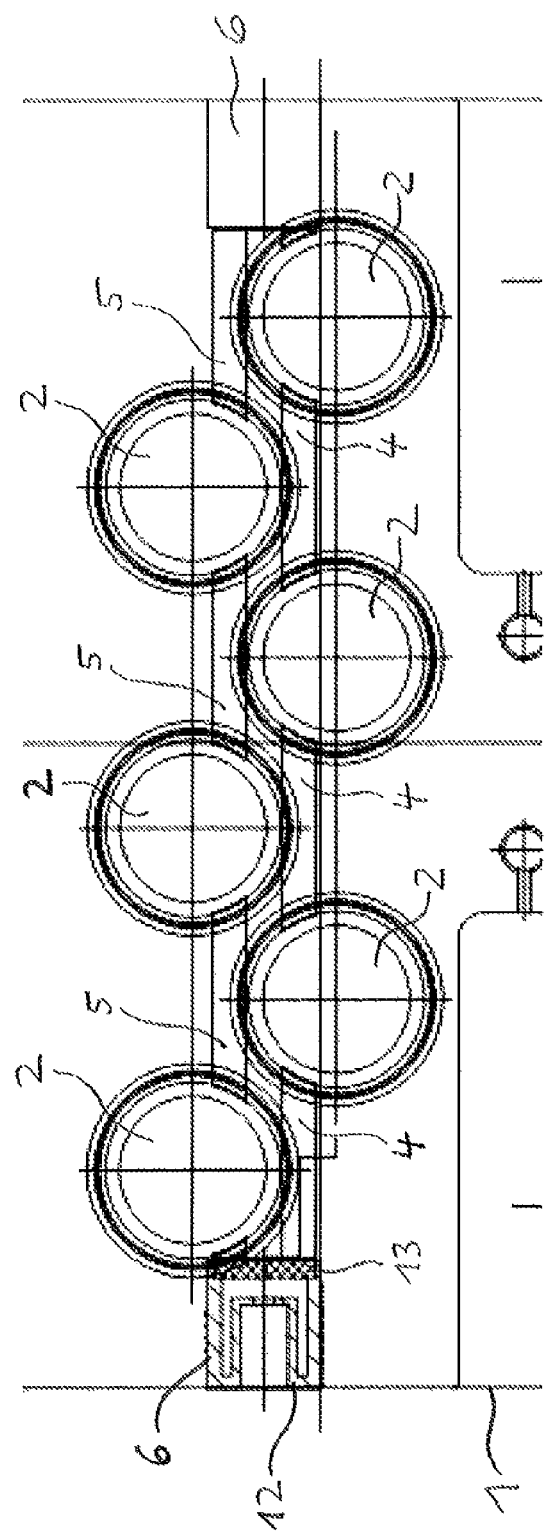
Figure 3:
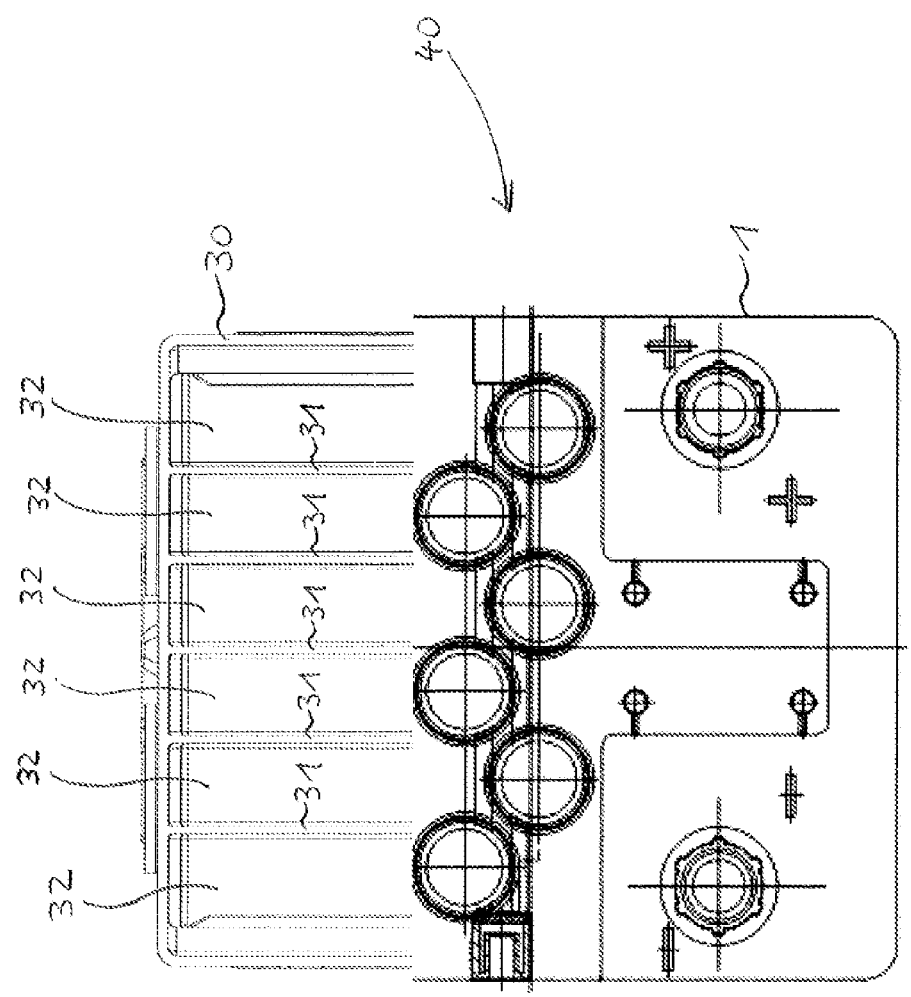

FIG. 2—shows an excerpt from view A of FIG. 1 in an enlarged illustration in the form of a detail, and FIG. 3—shows a cover part placed onto a housing lower part in a top view of the cover part, and FIG. 4—shows a side view of a cover part and of a housing lower part, and FIG. 5—shows a second embodiment of a cover part in various views.

The same reference symbols are used in the figures for elements corresponding to one another.

FIG. 1 shows a first embodiment of a cover part 1 in various views. In view A, the cover part is illustrated in a top view which is visible when looking toward the top side of an accumulator. View B shows a section along the sectional line indicated by the arrows 10. View C shows a side view in the y-direction according to the coordinate system illustrated. Views D and E show in each case a side view in the x-direction, in view D an ignition protection frit insert being arranged in a reception chamber, and in view E the reception chamber being visible without the ignition protection frit insert.

The cover part 1 has six degassing orifices 2, 3 which are to be closed in each case by means of closing plugs (not illustrated). Conventional closing plugs, which are also used for larger forms of construction of accumulators, may be employed in this case. A first degassing duct 4 runs in the cover part 1 in the x-direction and a second degassing duct 5 runs parallel thereto. The first degassing duct 4 runs through the lower three filling orifices 2, 3, and the second degassing duct 5 runs through the upper three filling orifices. As can be seen particularly in view B, the degassing ducts 4, 5 run between the top side and the underside of the cover part 1. The closing plugs have in each case an upper seal and a lower seal, for example in the manner of an O-ring. The seat surfaces 13 and 14 for the upper and the lower seal can be seen. The degassing ducts 4, 5 are thereby sealed off both with respect to the upper cover member and with respect to the lower cover member. In the closing plugs, gas ducts are provided, for example in the manner of a labyrinth, through which gas can pass out of the interior of the accumulator through the filling orifices 2, 3 into the degassing ducts 4, 5 even when a closing plug is inserted into a degassing orifice 2, 3. In order to avoid an undesirably high escape of liquid acid, the closing plugs may be designed on the siphon principle, so that only insignificant limited quantities of acid can pass into the degassing ducts 4, 5 if the accumulator is tilted.

The degassing ducts 4, 5 end in each case on the left side and right side of the cover part 1 in gas outlet orifices 6 which are designed at the same time as reception chambers for an ignition protection frit insert 12. Such an ignition protection frit insert 12 may in each case be inserted into both reception chambers 6 or, depending on the desired use of the accumulator, only into one of the reception chambers 6. The other reception chamber 6 is then closed completely, for example by means of a corresponding closing plug.

The ignition protection frit insert 12 may be designed as a plug-in plug. It has an ignition protection frit 13 made from flame-retarding material.

What can also be seen in FIG. 1 is that the cover part 1 has two terminal poles 11, as is customary in accumulators of this type. FIG. 1 and the further figures show a six-cell accumulator by way of example. However, the invention is also suitable for accumulators having a lower or higher number of cells.

As can be seen particularly in view A, the two rows 8, 9 of the filling orifices are arranged so as to be offset to one another in such a way as to give rise to a more closely packed arrangement in the x-direction than in the case of a completely single-row arrangement, as depicted, for example, in FIG. 1 of WO 2010/023316 A1.

The figure shows the middle region of the cover part 1 from view A of FIG. 1 as an excerpt in an enlarged illustration, so that the position of the degassing orifices and of the degassing ducts 4, 5 can be seen even more clearly.

FIG. 3 shows an accumulator 40 in a top view, that is to say in a view corresponding to view A of FIG. 1, the cover part 1 being illustrated only partially and therefore partially allowing a look at a housing lower part 30 arranged under it. As can be seen, the housing lower part 30 has five cell walls 31 which run in the interior and by which, together with the outer walls of the housing part 30, six cell vessels 32 are formed correspondingly to the number of cells of the accumulator 40. The filling orifices 2, 3 are arranged in each case above a cell space 32, so that the respective cell space can be filled with liquid electrolyte via its filling orifice 2, 3.

FIG. 4 shows the cover part 1 according to view C of FIG. 1 and, in a comparable view, the housing lower part 30 of the accumulator 40 before the cover part 1 is fastened to the housing lower part 30. Once again, the cell walls 31 and the cell vessels 32 formed between them can be seen.

FIG. 5 shows a second embodiment of a cover part 1 according to the invention which differs from the embodiment according to FIG. 1 in that the degassing ducts 4, 5 are arranged further apart from one another and, correspondingly, the rows 8, 9 of filling orifices 2, 3 also lie further apart from one another. The degassing orifices of the degassing ducts 4, 5 correspondingly also lie further apart from one another at the point where they issue into the reception chambers 6. So that the reception chamber 6 can nevertheless be provided with a single ignition protection frit insert simply and quickly, FIG. 5 illustrates an embodiment of the reception chamber 6 and of an ignition protection frit insert 12 suitable for it which has an elongate shape. The reception chamber 6 and the ignition protection frit insert 12 have a width b which is greater than a height h and additionally is greater than the diameter of the ignition protection frit 13 to be used.

Instead of the two rows 8, 9 of filling orifices 2, 3, as illustrated in the exemplary embodiments, more than two rows may, of course, also be provided.

The invention claimed is:

1. Cover part of an electrochemical accumulator, which cover part is designed to form an upper covering of the housing of the accumulator, the cover part having a plurality of filling orifices, to be closed by means of closing plugs, for filling the housing with liquid electrolyte, characterized in that the filling orifices are arranged so as to be offset to one another in at least two rows lying next to one another, and by which the filling orifices are arranged so as to overlap, as seen transversely to the direction of the extent of the rows.

2. Cover part according to claim 1, characterized in that the closing plugs of various rows of filling orifices are arranged so as to overlap, as seen transversely to the direction of extent of the rows, when the closing plugs are inserted into the filling orifices.

3. Cover part according to claim 1, characterized in that the closing plugs of various rows of filling orifices are arranged so as to overlap, as seen in the direction of extent of the rows, when the closing plugs are inserted into the filling orifices.

4. Cover part according to claim 1, characterized in that the cover part is designed to be attached to a housing lower part which has a multiplicity of cell walls which extend longitudinally transversely to the direction of extent of the rows of filling orifices and by which cell vessels arranged in a single row and separated from one another are formed in the housing lower part.

5. Cover part according to claim 1, characterized in that the filling orifices are connected to one or more degassing ducts running in the cover part, the degassing duct or degassing ducts issuing into one or more gas outlet orifices of the cover part which are designed for discharging via the degassing duct or degassing ducts gases which are formed inside the accumulator.

6. Cover part according to claim 5, characterized in that the degassing duct runs essentially centrally through the filling orifices connected to the degassing duct.

7. Cover part according to claim 5, characterized in that filling orifices of various rows are connected to one another via a common degassing duct.

8. Cover part according to claim 7, characterized in that the common degassing duct tangentially intersects the filling orifices connected to it.

9. Cover part according to claim 5, characterized in that different rows of filling orifices have in each case dedicated continuous degassing ducts which issue in separate degassing orifices.

10. Cover part according to claim 5, characterized in that the degassing orifices in the cover part issue into a common reception chamber for an ignition protection frit insert.

11. Cover part according to claim 5, characterized in that adjacent rows of filling orifices have in each case dedicated adjacent degassing ducts which run at a distance from one another which is no greater than the diameter of a reception chamber for an ignition protection frit insert.

12. Cover part according to claim 10, characterized in that the reception chamber for an ignition protection frit insert is designed as an elongate chamber, the width of which is greater than the height and greater than the diameter of the ignition protection frit to be used.

13. Cover part according to claim 5, characterized in that adjacent degassing ducts run parallel to one another.

14. Accumulator having a cover part according to claim 1, which is fastened to a housing lower part of the accumulator.

* * * * *